(12) United States Patent
Miyake (10) Patent No.: US 7,778,726 B2
(45) Date of Patent: Aug. 17, 2010

(54) NONLINEAR CONTROLLER AND NONLINEAR CONTROL METHOD

(75) Inventor: Yoshihiro Miyake, Yokohama (JP)

(73) Assignee: Tokyo Institute of Technology, Tokyo (JP)

( * ) Notice: Subject to any disclaimer, the term of this patent is extended or adjusted under 35 U.S.C. 154(b) by 340 days.

(21) Appl. No.: 10/588,770

(22) PCT Filed: Feb. 1, 2005

(86) PCT No.: PCT/JP2005/001429

§ 371 (c)(1),
(2), (4) Date: May 9, 2007

(87) PCT Pub. No.: WO2005/076091

PCT Pub. Date: Aug. 18, 2005

(65) Prior Publication Data

US 2007/0282464 A1 Dec. 6, 2007

(30) Foreign Application Priority Data

Feb. 10, 2004 (JP) .............................. 2004-034174

(51) Int. Cl.
*G06F 19/00* (2006.01)
*G05B 15/00* (2006.01)
*G05B 13/02* (2006.01)

(52) U.S. Cl. ........................... 700/210; 700/31; 700/83; 700/86; 700/245

(58) Field of Classification Search ................... 700/31, 700/210, 83, 86, 245; 901/8, 50
See application file for complete search history.

(56) References Cited

U.S. PATENT DOCUMENTS 5,403,261 A 4/1995 Shimizu et al.

(Continued)

FOREIGN PATENT DOCUMENTS

JP 2000-349920 A 12/2000

(Continued)

OTHER PUBLICATIONS

Komatsu et al., "Mutual Compensation based Communication Support Agent in 'Man-Machine-Man System'" 1999, p. IV-17 through 22.*

(Continued)

*Primary Examiner*—Albert DeCady
*Assistant Examiner*—Thomas Stevens
(74) *Attorney, Agent, or Firm*—Westerman, Hattori, Daniels & Adrian, LLP (57) ABSTRACT

An object of the present invention is to provide a novel controller and a control method which, in a nonlinear system in which a controller 1 and a controlled object 2 cannot be clearly separated, can converge the relationship between the controller 1 and controlled object 2 to a target relationship.

The controller 1 of the present invention comprises a first module 3 having dynamic behavior as a nonlinear system and a second module 4 as a feedback system. The first module 3 creates a synchronous state with the controlled object 2 through an entrainment effect in an interaction therewith. When a synchronous state is created between the first module 3 and the controlled object 2, the second module 4 provides feedback to adjust a parameter of the first module 3 based on the difference between a relation value 5 relating to the synchronization and a target relation value. The controlled object 2 is controlled by the convergence of the relation value 5 relating to the synchronization to the target value.

14 Claims, 7 Drawing Sheets

U.S. PATENT DOCUMENTS 7,209,867 B2 *    4/2007   Vigoda et al. ............... 702/189

FOREIGN PATENT DOCUMENTS

| JP | 2001-299980 A | 10/2001 |
|---|---|---|
| JP | 2002-336376 A | 11/2002 |
| JP | 2004-73649 A | 3/2004 |
| JP | 2005-74156 A | 3/2005 |
| JP | 2005-96068 A | 4/2005 |

OTHER PUBLICATIONS

Komatsu et al.,"Two Dynamics of Anticipatory Behavior in Synchronization Tapping" 2003 SICE Annual Conference in Fuki p. 1012-1015.*

Miller G.M., "Modern Electronic Communication" 1998 p. 209 and 209.*

Miyake et al., "Mutual Adaptation in Human-Robot Cooperative Walk" IEEE 1997 p. 124-129.*

Miyake et al., "Mutual Entrainment Based Human-Robot Communication Field", IEEE 1994, p. 118-123.*

Muto et al., "Analysis of the Process of Mutual Interaction between Human and Internal Control Model". IEEE 2000, p. 769-774.*

Takeshi Muto et al., "Analysis of Co-emergence Process on the Human-Robot Cooperation for Walk-support", The Society of Instrument and Control Engineers Ronbunshu, vol. 38, No. 3, pp. 316-323, 2002.

Gen Aoyama et al., "Walking Pattern Generation based on the Interaction of Phase Oscillators and Dynamical Models", The Institute of Electronics, Information and Communication Engineers, vol. 101, No. 735, pp. 175-182, 2002.

Gentaro Taga, "Search for Design Principle of Biological System", Saiensu-Sha. Co. Ltd., Mathematical Science No. 394, pp. 5-13, 1996.

International Search Report mailed May 17, 2005 of International Application PCT/JP2005/001429, p. 1-23.

European Search Report dated Jul. 28, 2008, issued in corresponding European Patent Application No. 05709575.4.

Miyake, Yoshihiro et al.; "Internal Observation and Mutual Adaptation in Human-Robot Cooperation"; IEEE Intenational Conference, vol. 4, pp. 3685-3690, Oct. 11, 1998.

Muto, Takeshi et al.; "Analysis of the Co-emergence Process on the Human-Human Cooperation"; Proceedings of the 2002 IEEE International Workshop on Robot and Human Interactive Communication, pp. 65-70, Sep. 25-27, 2002.

Miyake Yoshihiro et al.; Mutual Entrainment Based Human-Robot Communication Field—Paradigm shift from "Human Interface" to "Communication Field"—; IEEE International Workshop on Robot and Human Communiction, pp. 118-123, Jul. 18, 1994.

Muto, Takeshi et al.; "Temporal Development of Mutual Constraint Cycle in Human-Robot Cooperation"; Systems, Man, and Cybernetics, 1999 IEEE, vol. 4, pp. 7-10, Oct. 12, 1999.

Miyake, Yoshihiro et al.; "Mutual Adaptation in Human-Robot Cooperative Walk—Mutual-entrainment-based internal control"; IEEE International Workshop on Robot and Human Communication, pp. 124-129, Sep. 29, 1997.

Yuasa, H. et al; "Coordination of Many Oscillators and Generation of Locomotory Patterns"; Biological Cybernetics, vol. 63, No. 3, pp. 177-184, Jul. 1, 1990.

Watanabe, Tomio et al; "Analysis of Entrainment in Face-to-Face Interaction Using Heart Rate Variability"; IEEE International Workshop on Robot and Human Communication, pp. 141-145, Nov. 11, 1996.

Pogromsky, Alexander et al.; "Cooperative Oscillatory Behavior of Mutually Coupled Dynamical Systems"; IEEE Transactions on Circuit and Systems Part I: Fundamental Theory and Applications, vol. 48, No. 2, Feb. 1, 2001.

Japanese Office Action dated Dec. 15, 2009, issued in corresponding Japanese Patent Application No. 2004-034174.

* cited by examiner

FIG. 7 ated with time and an entrainment effect created through an interaction therebetween are often observed. There is an attempt to utilize such nonlinear vibrations and a nonlinear interaction therebetween. For example, an example in which nonlinearity is used for control of the walking motion of a bipedal robot to stabilize the walking motion (see Non-patent Document 1) and an example in which such nonlinearity is applied to assistance for communication between human beings (Patent Document 1) have been reported. The effectiveness of such systems utilizing nonlinear vibrations or a synchronous effect created through an interaction therebetween (which is referred to as "entrainment effect") for improvement in the global stability of the walking motion against changes in environment and for improvement in realism in communication between human beings has been reported. This is the effect achieved by avoiding applying linear approximation unreasonably to achieve feedback control thereof.

NONLINEAR CONTROLLER AND NONLINEAR CONTROL METHOD

TECHNICAL FIELD

The present invention relates to a nonlinear controller and a nonlinear control method. More specifically, the present invention relates to a nonlinear controller and a nonlinear control method which, in a nonlinear system that a controller and a controlled object cannot be clearly separated, can converge a relation value relating to synchronization between the controller and the controlled object to a target value.

BACKGROUND ART

Feedback control is a control method for stably converging the state of a controlled object to a predetermined target state by that a feedback loop is formed with a controller and the controlled object. In feedback control, however, the controller unilaterally controls the controlled object to forcibly transform it into a target state. It is, therefore, a prerequisite that the dynamic behavior (dynamics) of the controller and controlled object can be clearly separated. It has hence been effectively used only when the prerequisite can be fulfilled.

With increase in size and complexity of artificial systems in recent years, there are increasing number of cases where a controller and a controlled object cannot be necessarily separated clearly. The tendency is strong in systems including human beings as part of it. The dynamics of the controller and controlled object mutually interfere with each other. Such situations are referred to as nonlinearity of system, and there has been used a method in which a controller and a controlled object are separated with a linear approximation and used in conventional feedback control. Also, a linear approximation and a feedback control have been unreasonably applied to a nonlinear system which does not fulfill the prerequisite or a system having so strong nonlinearity that a linear approximation cannot be substantially used to it.

In such circumstances, there has been proposed a system which does not unreasonably linearize a nonlinear system but positively utilize its nonlinearity. In a nonlinear system, when dynamics of a controller and a controlled object mutually interfere with each other, nonlinear vibrations (limit cycles, for example) in which the states thereof vibrationally fluctu-

[Patent Document 1] JP-A-2000-349920 (sections 0004 and 0018 to 0025, FIG. 1 to FIG. 6, etc.)

[Non-patent Document 1] "Search for Design Principle of Biological System," Gentaro Taga, Mathematical Science No. 394, pp. 5 to 13, published in 1996 by SAIENSU-SHA. Co. Ltd.

DISCLOSURE OF INVENTION

Problem to be Solved by the Invention

The dynamics of nonlinear vibrations create utilities such as stability and autonomy of a system but, at the same time, have the problem of being difficult to control. In addition, since the dynamics of a controller and a controlled object cannot be still separated in such a nonlinear system, there still remains the problem that a control method for the convergence to a target state is not obvious and the system cannot be fully utilized unless it is adjusted by a try-and-error method.

The present invention has been made in view of the above problems and it is, therefore, an object of the present invention to provide a novel controller and a control method which, in a nonlinear system in which a controller and a controlled object cannot be clearly separated, can converge the relationship between the controller and controlled object to a target relationship.

Means for Solving the Problem

The present invention uses dynamic behavior (dynamics) peculiar to a nonlinear system by positively utilizing the nonlinearity thereof and combines a feedback control method with it to reconstruct the nonlinear system as a controllable system. A novel control method can be thereby realized which, in a nonlinear system that a controller and a controlled object cannot be clearly separated, can converge the relationship between the controller and controlled object to a target relationship. The control method will be referred to as "relational system control method."

Figure 1:
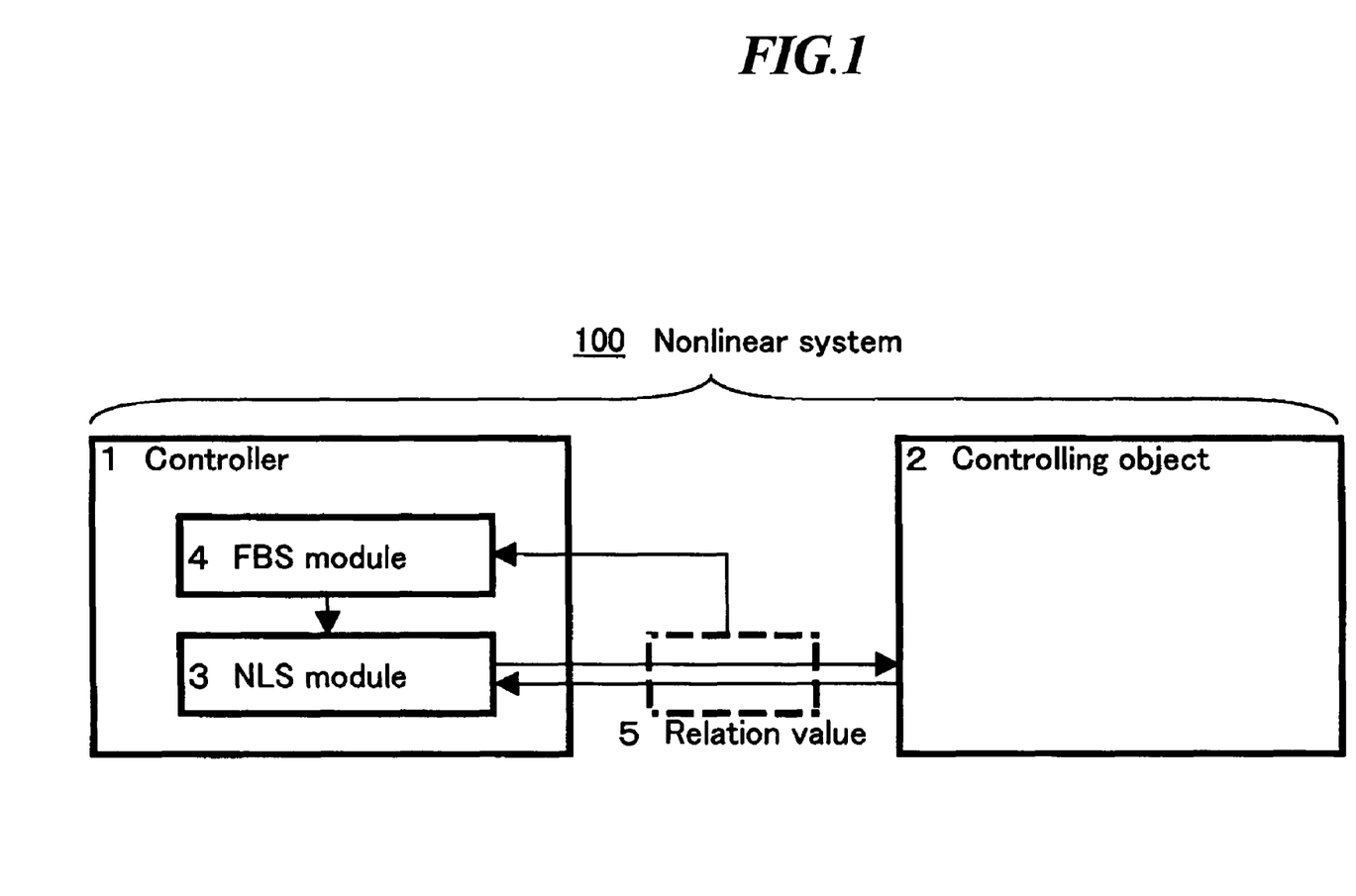
FIG. 1 is a view schematically illustrating an example of the construction of a nonlinear control system according to an embodiment of the present invention.

A nonlinear controller 1 in the present invention includes, as shown in FIG. 1, for example, a first module 3 composed of a nonlinear system (NLS) for creating a synchronous state with a controlled object 2 through a nonlinear interaction with the controlled object 2; a second module 4 composed of a feedback system (FBS) for adjusting a parameter to vary a relation value 5 relating to the synchronization of the first module 3 with the controlled object 2 based on the difference between the relation value 5 and a target relation value, in which the controlled object 2 is controlled by converging the relation value 5 relating to the synchronization of the first module 3 to the target relation value.

Then, control for the convergence of a relation value to a target value in control of a nonlinear system, which has been considered difficult to achieve, can be achieved through an interaction between nonlinear vibrations.

The controller 1 is constituted of a first module 3 and a second module 4. The first module 3 is a nonlinear system (NLS). More specifically, the first module 3 is constructed as a nonlinear vibration system, and achieves a synchronous state with the controlled object 2 also having characteristics of a nonlinear vibration system through an entrainment effect in an interaction therewith. The second module 4 is a feedback system (FBS) which, when a synchronous state is formed between the first module 3 and the controlled object 2, measures a relation value 5 relating to the synchronization, calculates an appropriate feedback control amount by comparing the relation value 5 with a target relation value, and adjusts a parameter of the first module 3 to vary the relation value 5 relating to the synchronization. The relation value 5 relating to the synchronization between the controller 1 and the controlled object 2 is thereby converged to a target relation value.

As describe above, there can be provided a "relational system control method" by which a relation value relating to synchronization can be converged to a target value 5 even when the dynamic behavior of the controller 1 and the controlled object 2 cannot be clearly separated by the combination of the characteristics of a nonlinear system with the characteristics of feedback control. The synchronous state means a state in which nonlinear vibrations with different frequencies spontaneously have the same frequency and a specific phase relationship. Here, since the state is transferred from nonlinear vibrations to a synchronous state, the term "synchronous state" includes a state close to a state in which the vibrations have the same frequency and a specific phase relationship, such as a state in which the vibrations have the same frequency on average and a specific phase relation on average.

In a preferred embodiment, in the nonlinear controller 1 according to the present invention, the first module 3 and the controlled object 2 vibrate at different natural frequencies, and the nonlinear interaction has an entrainment effect. Then, the nonlinear system can be controlled by creating an entrainment effect in the interaction.

Here, an entrainment effect is a process of mutual adaptation of dynamics between different nonlinear vibrations and a phenomenon in which nonlinear vibrations with different frequencies spontaneously reach a synchronous state through an interaction. An entrainment effect is described for example as follows: conversational communication becomes smooth or deep when the two people recognize the other's behaviors such as nodding, opening and closing motions of the mouth and gestures in addition to the other's vocal sound and share the rhythm of conversation to pull each other into their own story (which is referred to as physical entrainment effect or simply as entrainment effect) (see Patent Document 1).

In a preferred embodiment, in the nonlinear controller 1 according to the present invention, the relation value 5 relating to the synchronization is the phase difference $\Delta\phi$ between the vibration of the controlled object 2 and the vibration of the first module 3, and the parameter is the natural frequency $\omega 1$ of the first module 3. Then, control of the controlled object 2 with a natural frequency $\omega 2$ which is different from that of the controller 1 can be achieved by positively utilizing the synchronous state.

In a preferred embodiment, in the nonlinear controller 1 according to the present invention, the synchronous state between the first module 3 and the controlled object 2 is achieved through transmission and reception of rhythm. Then, since a state variable can be transmitted and received between the controller 1 and the controlled object 2 through a sensor or rhythm sound output, the controller can be composed of a small and light device such as a pacemaker. Also, a wide variety of applications can be realized using transmission and reception of rhythm.

In a preferred embodiment, in the nonlinear controller 1 according to the present invention, the synchronous state between the first module 3 and the controlled object is achieved through a radio wave or network. Then, since a synchronous state can be realized by remote control through a radio wave or network, various data can be used and various application can be realized between remote locations.

Figure 4:
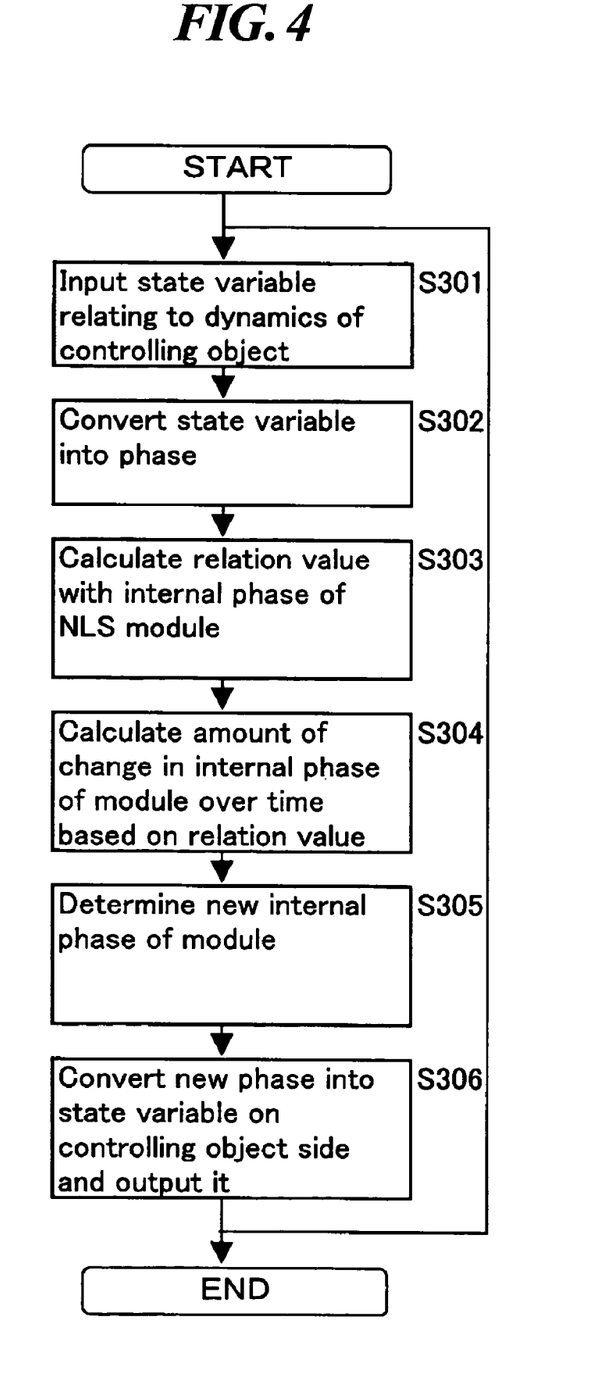
FIG. 4 is a flowchart of a processing algorithm of the NLS module.
Figure 6:
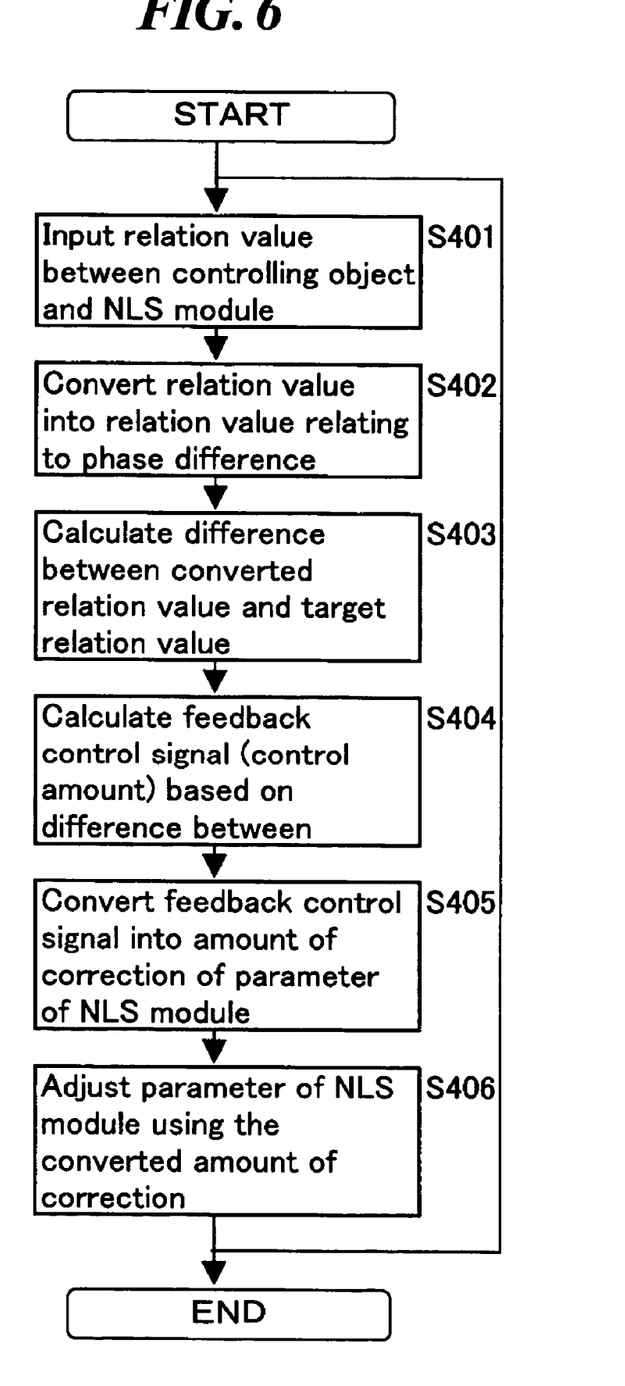
FIG. 6 is a flowchart of a processing algorithm of the FBS module.

A nonlinear control method in the present invention includes, as shown in FIG. 4 and FIG. 6, for example, a step of creating a synchronous state with a controlled object 2 through a nonlinear interaction with the controlled object 2, a step of acquiring a state variable relating to the dynamic behavior of the controlled object 2 (step S301), a step of adjusting a parameter for varying a relation value 5 relating to the synchronization with the controlled object 2 based on the difference between the relation value 5 relating to the synchronization with the controlled object 2 and a target relation value (steps S403 to S406), and a step of creating a new synchronous state with the controlled object 2 using the adjusted parameter (steps S303 to S306).

Then, control for the convergence of a relation value to a target value in control of nonlinear system, which has been considered difficult to achieve, can be achieved through an interaction between nonlinear vibrations.

A program according to the present invention is a program readable by a controller for causing the controller 1 to perform the nonlinear control method according to the present invention.

This application is based on Japanese Patent Application No. 2004-34174 filed on Feb. 10, 2004 in Japan, the entire content of which is incorporated herein by reference.

The present invention can be fully understood, referring to the following description in details. Extensive applications of the present invention will be apparent from the following detailed description. It should be noted that the detailed description of the invention and specific examples are preferred embodiments of the invention, only for the purpose of the description thereof. It is apparent to the person ordinary skilled in the art that various modifications and variations can be made based on the detailed description within the scope and spirit of the present invention. The applicant does not intend to dedicate any disclosed embodiment to the public, and to the extent any modification or alternations may not literally fall within the scope of the claims, they are considered to be part of the invention under the doctrine of the equivalents.

It should be understood that each of the nouns and reference terms used in the description of this specification and claims means both singular and plural unless otherwise stated or unless apparently negated in the context. The examples shown herein and illustrative terms (such as "etc.") used herein are intended to make the explanation of the present invention easy and not intended to limit the scope of the present invention unless specifically stated in the claims.

Effects of the Invention

According to the present invention, the relationship between a controller and a controlled object in a nonlinear system in which the controller and controlled object cannot be clearly separated can be converged to a target relationship. Thus, control of a nonlinear system can be achieved by positively utilizing the nonlinearity thereof even if a liner approximation is not unreasonably applied to the nonlinear system to achieve feedback control thereof. In addition, various applications to control of a nonlinear system can be realized.

DESCRIPTION OF REFERENCE NUMERALS

1: controller
2: controlled object
3: NLS module
4: FBS module
5: relation value
6, 7: partial system
11: walking machine
12: walking motion
13: NLS module
14: FBS module
15: signal input mechanism
16: signal output mechanism
31: signal input section
32: operation section
33: signal output section
41: signal input section
42: operation section
43: signal output section
100, 200: nonlinear system
$\Delta\phi$: phase difference
$\omega 1$, $\omega 2$: natural frequency

BEST MODE FOR CARRYING OUT THE INVENTION

Description will be hereinafter made of an embodiment of the present invention with reference to the drawings.

FIG. 1 is a view schematically illustrating an example of the construction of a nonlinear control system according to an embodiment of the present invention. In a nonlinear system 100 constituted of a controller 1 and a controlled object 2, the controller 1 is constituted of a first module 3 and a second module 4. The first module 3 is a nonlinear system module (which will be hereinafter referred to simply as an NLS module), and the second module 4 is a feedback system module (which will be hereinafter referred to simply as an FBS module).

The controller 1 constituted of two modules: a first module 3 as a nonlinear system and a second module 4 as a feedback system, and the controlled object 2 is controlled according to feedback from the second module 3 to the first module 3, which forms a synchronous state with the controlled object 2 through a nonlinear interaction, so as to converge a relation value 5 relating to the synchronization with the controlled object 2 to a target relation value. That is, a "relational system control method" is applied as a method for controlling a nonlinear system.

The nonlinear system 100 is constituted of the controller 1 and the controlled object 2. Nonlinearity means that the dynamic behavior (dynamics) of the controller 1 and the controlled object 2 cannot be separated. Conventional feedback control is applicable only to linear systems, which corresponds to the fact that the dynamics of a controller 1 and a controlled object 2 can be separated. The controller 1 can control the controlled object 2 since their dynamics can be separated. In a nonlinear system, since their dynamics cannot be separated, to control results to be controlled. Thus, what is called feedback control cannot be established.

In that sense, nonlinear systems are difficult to control. However, when attention is focused on nonlinear vibrations and a synchronous relation caused by an entrainment effect thereof, control can be partially carried out. This embodiment is based on. the assumption that the controller 1 and the controlled object 2 have dynamics of nonlinear vibrations and can create an entrainment effect through an interaction to synchronize with each other. The an entrainment is a synchronous effect peculiar to an interaction between nonlinear vibrations. During a process of mutual adaptation of dynamics between nonlinear vibrations with different frequencies, synchronized vibrations with the same frequency and a specific phase relation are spontaneously achieved. Here, since the state is transferred from nonlinear vibrations to a synchronous state, the term "synchronous state" includes a state close to a state in which the vibrations have the same frequency and a specific phase relationship, such as a state in which the vibrations have the same frequency on average and a specific phase relation on average.

The controller 1 is constituted of the first module 3 and the second module 4. The first module 3 is a nonlinear system. More specifically, the first module 3 is constructed as a nonlinear vibration system, and achieves a synchronous state with the controlled object 2 also having characteristics of a nonlinear vibration system through an entrainment effect in an interaction therewith. The second module 4 is a feedback system which, when a synchronous state is formed between the first module 3 and the controlled object 2, measures a relation value 5 relating to the synchronization between the first module 3 and the controlled object 2, calculates an appropriate feedback control amount by comparing the relation value 5 with a target relation value, and provides feedback to the first module 3 by adjusting a parameter of the first module 3 to vary the relation value 5 relating to the synchronization. The target relation value can be thereby achieved in a synchronous state between the controller 1 and the controlled object 2.

As describe above, according to this embodiment, there can be provided a "relational system control method" by which a relation value between a controller and a controlled object can be converged to a target value even when the dynamics of the controller and the controlled object cannot be clearly separated by combining the characteristics of a nonlinear system with the characteristics of feedback control.

Figure 2:
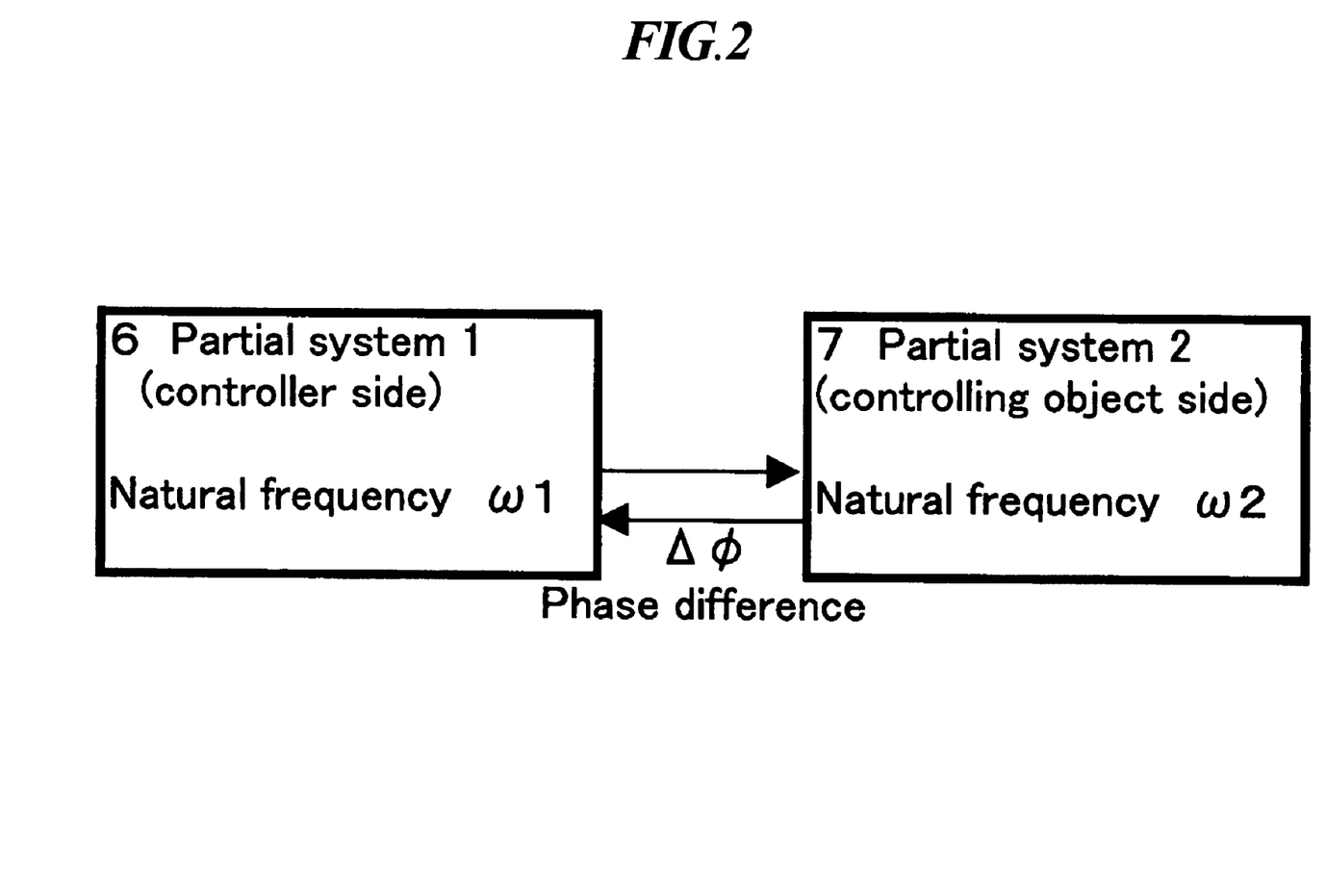
FIG. 2 is a view schematically illustrating an example of the construction of an interaction system between nonlinear vibrations.

FIG. 2 is a view schematically illustrating an example of the construction of an interaction system between nonlinear vibrations. Here, an entrainment effect as a base of this embodiment will be described supplementary. One partial system 6 corresponds to the controller 1, and another partial system 7 corresponds to the controlled object 2. Each of the partial systems 6 and 7 has dynamics of nonlinear vibration. The frequencies of the partial systems 6 and 7 are represented as $\omega 1$ and $\omega 2$, respectively, and the phase difference $\Delta\phi$ therebetween is taken as the relation value 5 relating to the synchronization of the vibrators. When the interaction between the partial systems 6 and 7 can be considered as symmetrical, the phase difference $\Delta\phi$ in an entrainment state synchronized through an interaction is as described in the following.

As explained qualitatively, there are the following three cases. The first case is when $\omega 1 > \omega 2$. In this case, $\Delta\phi > 0$, that is, the partial system 6 is advanced in phase from the partial system 7 in the entrainment state. The partial system 6 is advanced in timing from the partial system 7.

The second case is when $\omega1<\omega2$. In this case, $\Delta\phi<0$, that is, the partial system 7 is advanced in phase from the partial system 6. The third case is when $\omega1=\omega2$. In this case, $\Delta\phi=0$, that is, the partial system 1 and the partial system 2 have the same phase. Thus, adjusting the frequencies $\omega$ of the partial systems can vary the phase difference $\Delta\phi$ as a relation value between the partial systems.

With the characteristics of a nonlinear system, especially the characteristics of an entrainment effect in nonlinear vibrations as described above in mind, the construction of the controller 1 will be described again with reference to FIG. 1. The controller 1 is constituted of an NLS module 3 and an FBS module 4. The NLS module 3 is a section, which constitutes a nonlinear system together with a controlled object 2 and interacts with the controlled object 2, and can generate an entrainment effect. The FBS module 4 is a section, which performs feedback control of the NLS module 3 based on the difference between a relation value 5 ($\Delta\phi$) generated through such a nonlinear interaction and a target relation value, and controls the controlled object 2 by converging the relation value 5 into a target value.

Figure 3:
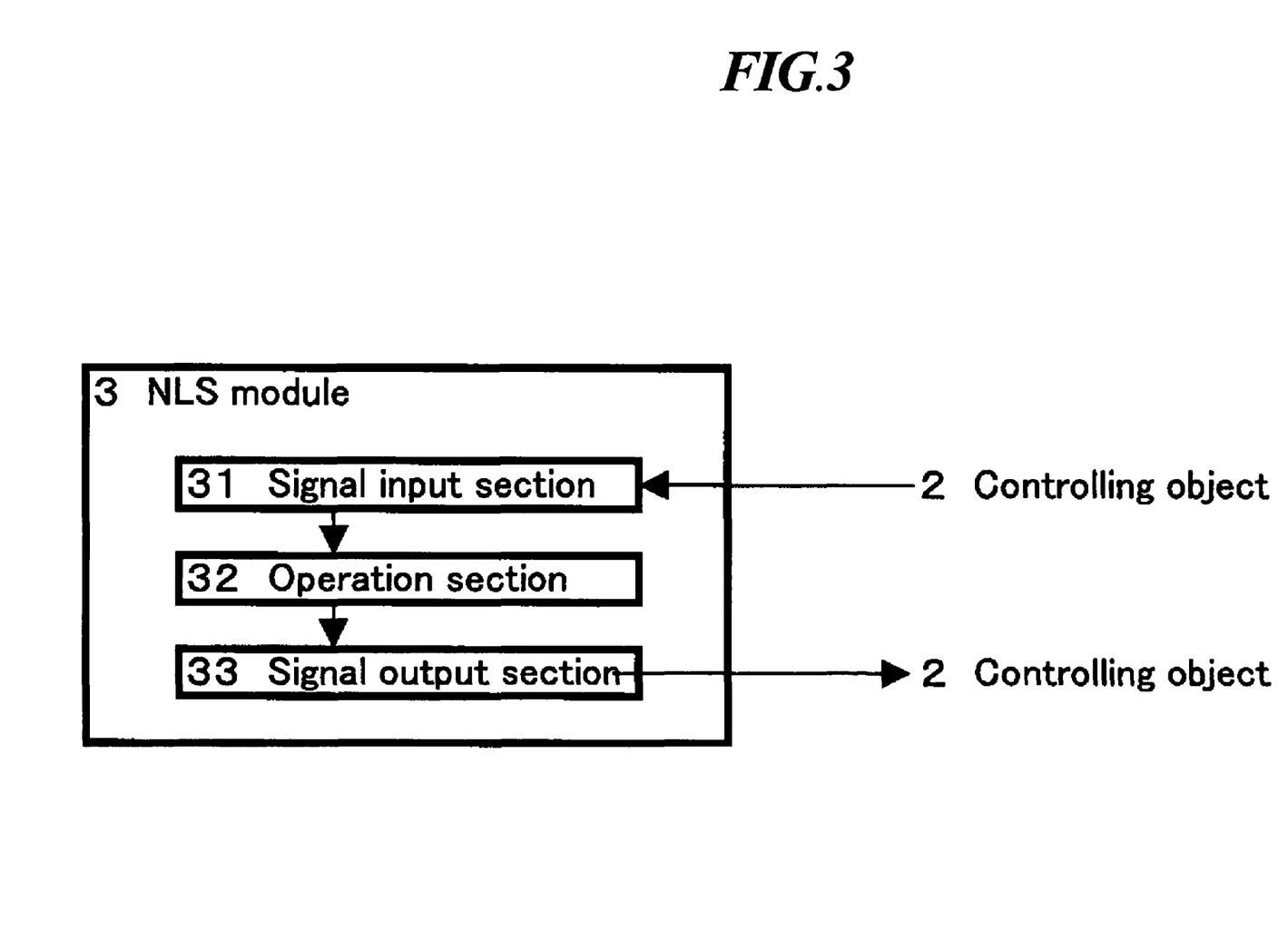
FIG. 3 is a view schematically illustrating an example of the construction of an NLS module.

FIG. 3 is a view schematically illustrating an example of the construction of the NLS module 3. The NLS module 3 is basically constructed as a system for generating dynamics as nonlinear vibrations. The NLS module 3 has a signal input section 31, an operation section 32 and a signal output section 33. The signal input section 31 is a section through which an external state variable relating to the controlled object 2, such as operational rhythm of vibration detected from the controlled object 2 by a sensor or the like, is inputted into the NLS module 3. The NLS module 3 has an internal state variable as nonlinear vibration and interacts with the controlled object 2 having the inputted external state variable. The operation section 32 is a section for fluctuating the internal state variable as nonlinear vibration over time. For example, the operation section 32 calculates the difference between the phase of vibration of the NLS module 3 and a target phase and creates new vibration (including a change in phase) for bringing it close to the target value to change the internal state variable. The signal output section 33 outputs the internal state variable determined in the operation section 32 to the controlled object 2. For example, the signal output section 33 transmits newly created vibration to the controlled object 2 as rhythm sound.

For example, when the dynamics of the controlled object 2 and the NLS module 3 can be approximated as nonlinear vibrations, the interaction between them can be expressed as follows:

$$d\phi1/dt=\omega1+k1\cdot\sin(\phi2-\phi1) \quad (1)$$

$$d\phi2/dt=\omega2+k2\cdot\sin(\phi1-\phi2) \quad (2)$$

wherein $\phi2$ and $\omega2$ represent the phase and natural frequency, respectively, of the controlled object 2 as state variables thereof, $\phi1$ and $\omega1$ represent the phase and natural frequency, respectively, of the NLS module 3 as state variables thereof, and k1 and k2 represent bond strengths (k1$\geq$0 and k2$\geq$0).

The equation (1) and equation (2) correspond to the NLS module 3 and the controlled object 2, respectively. Although the most simplest expression is made using the phases $\phi$, it is needless to say that more expanded multi-degree-of-freedom nonlinear vibrations can be also expressed.

FIG. 4 is a flowchart of a processing algorithm of the NLS module 3. The algorithm can be summarized as follows:

1} A state variable relating to the dynamic behavior (dynamics) of the controlled object 2 is inputted (step S301).

2) The inputted state variable is converted into a state variable relating to the phase (step S302).

3) A relation value (such as the difference) between the phase of the controlled object 2 and an internal phase of the NLS module 3 is calculated (step S303).

4) The amount of change in the internal phase of the NLS module 3 over time is calculated based on the relation value (step S304).

5) A new internal phase of the NLS module 3 is determined (step S305).

6) The phase is converted into a state variable on the controlled object 2 side and outputted (step S306).

7) The above 1) to 6) are continuously repeated.

Figure 5:
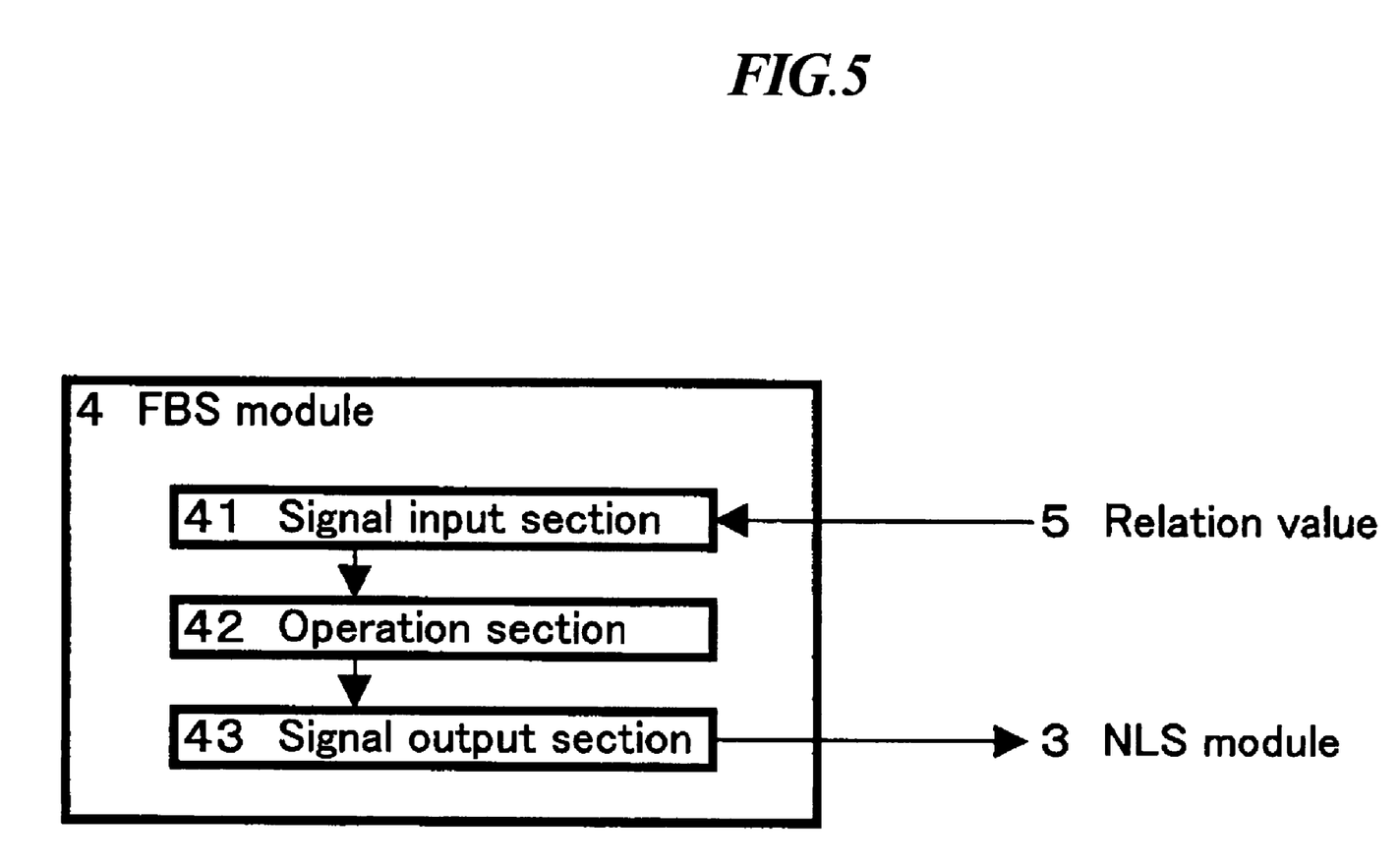
FIG. 5 is a view schematically illustrating an example of the construction of an FBS module.

FIG. 5 is a view schematically illustrating an example of the construction of the FBS module 4. The FBS module 4 is basically constructed as a system for realizing feedback control. The FBS module 4 has a signal input section 41, an operation section 42 and a signal output section 43. The signal input section 41 is a section through which a relation value 5 generated through a nonlinear interaction between the controlled object 2 and the NLS module 3, such as a relation value calculated in the operation section 32 of the NLS module 3, is inputted into the FBS module 4. The operation section 42 is a section for calculating a feedback control signal FB (more specifically, control amount) based on the relation between a target relation value and the inputted relation value. The signal output section 43 outputs the control signal FB determined in the operation section 42 to the NLS module 3 and adjusts a parameter for varying the relation value 5 in the NLS module 3.

For example, when the dynamics of the controlled object 2 and the NLS module 3 can be approximated as nonlinear vibrations, they can be expressed by the above equations 1 and 2. Thus, the relation value to be inputted into the FBS module 4 can be expressed as follows:

$$\Delta\phi=\phi1-\phi2 \quad (3)$$

When the target relation value is represented as $\Delta\phi0$, that is, the target relation value relating to the phase difference between the controlled object 2 and the NLS module 3 is defined as $\Delta\phi0$, the feedback control signal FB can be determined as follows:

$$FB=k3\cdot(\Delta\phi-\Delta\phi0) \quad (4)$$

wherein k3 is a coefficient (k3>0).

Thus, the NLS module 3 can be controlled based on the equation (4). As an example, it is effective to increase or decrease the natural frequency $\omega1$ of the NLS module 3 as a parameter.

$$d\omega1/dt=-FB=-k3\cdot(\Delta\phi-\Delta\phi0) \quad (5)$$

By preparing the equation (5), the target relation value can be realized between the controlled object 2 and the NLS module 3. Although the simplest feedback mechanism has been described above, it is needless to say that more expanded feedback control method can be also applied.

FIG. 6 is a flowchart of a processing algorithm of the FBS module 4. The algorithm can be summarized as follows:

1) A relation value between the controlled object 2 and the NLS module 3 is inputted (step S401).

2) The inputted relation value is converted into a relation value relating to the phase difference (step S402).

3) The difference between the converted relation value and a target relation value is calculated (step S403).

4) A feedback control signal FB (more specifically, a control amount) is calculated based on the difference between the relation values (step S404).

5) The calculated feedback control signal FB is converted into an amount of correction of a parameter (natural frequency, for example) of the NLS module 3 (step S405).

6) The parameter of the NLS module 3 is adjusted using the converted amount of correction of the parameter (step S406).

7) The above 1) to 6) are continuously repeated.

As has been described above, according to the embodiment of the present invention, even when feedback control cannot be achieved since mutual interference occurs between the controller 1 and the controlled object 2 because of their nonlinearity, control of a relation value between the controller 1 and the controlled object 2 can be achieved by the employment of a relational system control method for converging the relationship between the controller 1 and the controlled object 2 to a target relationship using the NLS module 3 constituting a nonlinear system and the FBS module 4 for controlling a relation value generated in the NLS module 3.

First Embodiment

The example of biofeedback in a machine-human system as a first embodiment of the present invention will be described hereinafter in detail.

In this field, a machine is a controller and human is a controlled object, and the aim is to control various states in the motion of a human being or in communication between human beings into a target state. However, many of the motions of a human body and communication between human beings involve nonlinearity, especially, nonlinear vibrations. Examples of nonlinear vibration in motions of a human body include walking or running rhythm, dances and exercises. Examples of nonlinear vibration in communication include poses and nodding in conversation. Also, musical ensembles formed of many people are included in the examples of nonlinear vibration. In the motions of a human body and communication, conventional biofeedback cannot be achieved because of their strong nonlinearity.

However, feedback control has been unreasonably applied to human by neglecting such nonlinear dynamics of human and applying a linear approximation thereto. Such a system not only requires unnatural dynamics to human but also may be harmful from the viewpoint of the assistance for body motions or communication. It is easily anticipated that a control method which positively utilizes nonlinearity of human can be easy to use for human beings.

Figure 7:
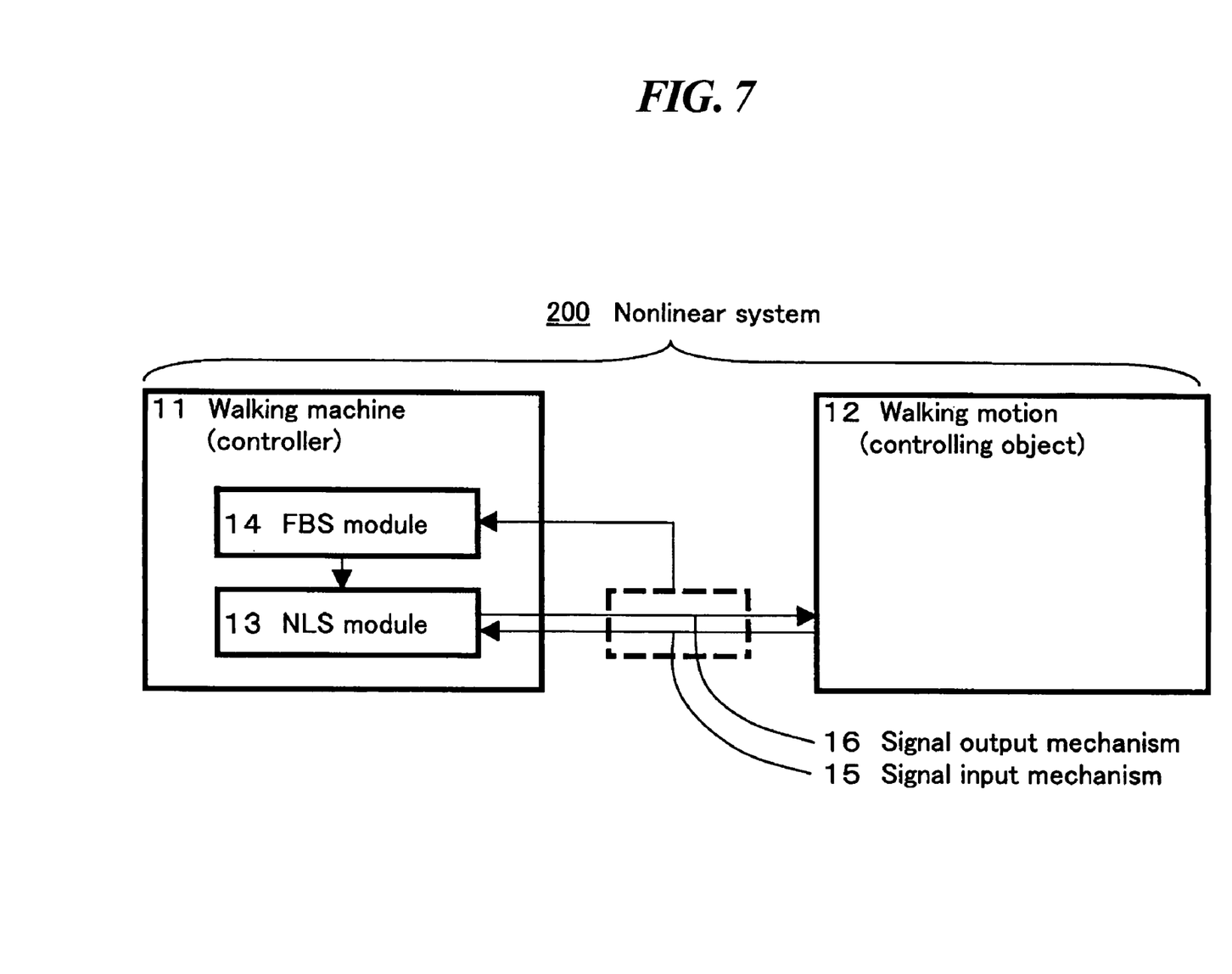
FIG. 7 is a view schematically illustrating an example of the construction of a machine-human control system in a first embodiment.

FIG. 7 is a schematic view illustrating an example of the construction of a machine-human control system 200 in this embodiment. This is an example of control of the walking motion of a human being with a walking machine (walking robot, for example) which walks in step with the human being. The walking machine walks in synchronization with the walking rhythm of the human being. In FIG. 7, designated as 11 is a walking machine corresponding to a controller and constituted of an NLS module 13 and an FBS module 14. A reference numeral 12 is the waking motion of a human being corresponding to a controlled object. A signal input mechanism 15 for inputting a signal outputted from the human side into the machine side and a signal output mechanism 16 for inputting a signal outputted from the machine side into the human side perform the communication between the walking machine 11 and the walking motion 12. A signal input section 31 (see FIG. 3) constitutes a part of the signal input mechanism 15, and a signal output section 33 (see FIG. 3) constitutes a part of the signal output mechanism 16.

Walking motion can be regarded as a type of nonlinear vibration, the dynamics of the motion of the feet can be represented by a phase (which is a function of time) and a natural frequency. In addition, as an interaction between the human side and the machine side, an interaction through exchange of rhythm signals accompanied by the motion of the feet can be established. In this case, the walking rhythm on the human side and the walking rhythm on the machine side interact with each other, and a nonlinear vibration system which can generate an entrainment synchronization can be constituted. In addition, the phase relation between them can be controlled.

The signal input mechanism 15 for transmitting a signal from the human walking motion 12 side to the walking machine 11 side can be configured to extract the timing at which a foot contacts the ground by a sensor detecting foot motion of human such as a pressure sensor attached to the bottom of a shoe which extracts the timing based on changes in pressure or an acceleration sensor attached to an ankle which extracts the timing based on changes in acceleration and to transmit the timing to the walking machine 11 side. The signal output mechanism 16 for transmitting a signal from the walking machine 11 side to the human walking motion 12 side can be configured to transmit the timing at which a foot of the walking machine 11 contacts the ground to the human side through an earphone worn by the human being as rhythm sound.

Now refer to FIG. 3 and FIG. 7. First, a state variable relating to the timing at which a foot contacts the ground (dynamic behavior) in the walking motion 12 of the human being as a controlled object (changes in pressure detected by a pressure sensor or changes in acceleration detected by an acceleration sensor) is inputted into the signal input section 31 of the NLS module 13 of the walking machine 11 corresponding to the controller (step S301). Based on the state variable, the phase on the human side (phase of walking rhythm) is calculated (step S302). The operation section 32 calculates the phase difference between the phase on the human side and an internal phase of the NLS module 13 (phase of the walking rhythm of the walking machine 11) according to, for example, the equation (3) (step S303). The amount of change over time attributed to an interaction with an internal phase of the NLS module 13 is calculated according to the equation (1) (step S304), and, based on it, a new phase is determined (step S305). Then, when the phase corresponding to the contact of a foot of the walking machine 11 with the ground matches the new phase, a state variable (rhythm sound, for example) relating to the timing at which the foot of the waling machine 11 contacts the ground is generated from the signal output section 33 and transmitted to the human side (step S306).

Next, refer to FIG. 5 and FIG. 7. A state variable relating to the timing at which a foot contacts the ground (dynamic behavior) in the walking motion 12 of a human being as a controlled object (changes in pressure detected by a pressure sensor or changes in acceleration detected by an acceleration sensor) is inputted into the signal input section 41 of the FBS module 14 of the walking machine 11 corresponding to the controller (step S401). Based on the state variable, the phase on the human side (phase of walking rhythm) is calculated, and the operation section 42 calculates a phase difference as a relation value between the phase on the human side and an internal phase of the NLS module 13 according to, for example, the equation (3) (step S402). The process up to this point is the same as the flow of the process in the NLS module 13 (except for the input of the internal phase of the NLS module 13), so that the process may be shared by the both modules. In the FBS module 14, the difference between the measured phase difference (relation value) and a target phase difference (target relation value) is calculated (step S403). Then, a feedback control signal FB is calculated according to, for example, the equation (4) (step S404), and, based on it, the amount of correction of, for example, the natural frequency ω1 (parameter) in the equation (1) regulating the dynamics of the NLS module 13 is calculated according to, for example, the equation (5) (step S405). The amount of correction is transmitted to the NLS module 13 via, for example, the signal output section 43 to adjust the parameter (step S406).

Three primary effects can be expected from the control method using the "relational system control method." The first effect is that a machine-human system easy to use for human beings can be constructed. Since many dynamics relating to the motion of a human body and communications between humans are nonlinear, a feedback system which unreasonably applies a linear approximation to such dynamics is very difficult to use for human. This adversely affects not only the operability but also the psychological aspect. According to this embodiment, however, natural motions of a human being or natural communication between human beings can be reconstructed in a machine-human system. The walking machine side is not necessarily a mechanical system constructed as hardware and may be composed of software employing a nonlinear control method and installed in a computer in a remote location or attached to a human being and a portable pacemaker which is attached to a human being may be controlled by the computer through a wired or wireless interface.

The second effect is that walking motion of a human being can be stabilized based on the dynamic stability of nonlinear dynamics. It is known that a synchronous state created as an entrainment effect of nonlinear vibrations has stability against external disturbances, and it can be applicable to global stabilization between the walking rhythm of a human being and the walking rhythm of a walking machine. This can be expected to be used as a walking assisting function such as protection of a person from a fall. The third effect is that the walking motion of a human being can be corrected by the feedback system. The relation value (phase difference, for example) is controllable in the entrainment state, so that a specific difference can be created between the walking rhythm on the machine side and the walking rhythm on the human side. Since the walking motion can be accelerated or decelerated by intentionally shifting the timing on the human side, a correction effect can be generated in walking rehabilitation and so on.

A method similar to the above is applicable to control of other machine-human systems. A similar system can be applicable not only to walking but also to running. In this case, the system creates an exercise effect and a health promoting effect in addition to the effects of the above embodiment. This method can be applicable to exercises using music such as dances and body using games when a phase for designating the playing position on the musical score and natural frequencies as the tempo of the music are defined. This can be applicable not only to dances but also to walking or running conducted to music. In addition, this method is applicable to a musical ensemble of human beings and machines or karaoke (which synchronizes with the tempo of a human). In this case, psychological effects such as harmony in the performance and extemporization are also included. In conversation, when phases and natural frequencies can be defined for the rhythm of speech and poses, this method is applicable to a sound interface (such as a robot using voice synthesis) which can adjust timing.

A similar method is applicable to control of a machine-animal system. When a sensor for detecting motion rhythm and a pacemaker having a loudspeaker for emitting rhythm sound are attached to a cow or sheep (or a plurality of cows or sheep) as a leader trained to walk following to rhythm sound to direct a cattle of cows or sheep to a meadow field or a barn with rhythm sound in accordance with the motion rhythm of the cows or sheep, the pacemaker can be regarded as a nonlinear controller. When the phase difference of the rhythm sound is used as a relation value, the cattle can be moved through the motion of the leader by using the amount of correction of a natural frequency.

When a synchronous state between the controller 1 and the controlled object 2 is achieved with a radio wave or network, a nonlinear control of a human, animal, machine etc. can be achieved by remote control. Further, various data can be used and various application can be realized between remote locations.

As described previously, according to this embodiment, the characteristics of a nonlinear system can be utilized to achieve a feedback control thereof. Thus, control of an interaction in a various types of machine-human systems, which could not be controlled by previous biofeedback, can be achieved.

Second Embodiment

An example of cooperative control in a machine-machine system as a second embodiment of the present invention will be described in detail.

In this field, feedback control has been mainly employed. One of the machines is defined as a controller (master) and the other machine as a controlled object (slave), and the controller can control the state of the controlled object into a target state. This is also true in a computer network. A system is constituted of a server computer (controller) and a client computer (controlled object). However, many of interactions in cooperative operations by a group of robots or on a computer network involve nonlinearity. Thus, when dynamics attributed to the nonlinearity is used, timing control between robots or between agents (software modules), which have been difficult to realize, can be achieved.

FIG. 7 can be applicable by analogy to a machine-machine system of this embodiment. That is, the walking motion 12 in the first embodiment may be replaced by a walking machine as a controlled object (which will be also designated as 12). This in an example in which one walking machine 11 (walking robot, for example) controls the walking motion of another walking machine (walking robot, for example). The first walking machine walks synchronously with the walking rhythm of the second walking machine.

Now refer to FIG. 3 and FIG. 7. First, a state variable relating to the timing at which a foot of the walking machine 12 as a controlled object contacts the ground (dynamic behavior) (changes in pressure detected by a pressure sensor or changes in acceleration detected by an acceleration sensor) is inputted into the signal input section 31 of the NLS module 13 of the walking machine 11 corresponding to the controller (step S301). Based on the state variable, the phase on the controlled object side (phase of walking rhythm) is calculated (step S302). The operation section 32 calculates the phase difference between the phase on the controlled object side and an internal phase of the NLS module 13 (phase of the walking rhythm of the walking machine 11) according to, for example, the equation (3) (step S303). The amount of change over time attributed to an interaction with an internal phase of the NLS module 13 is calculated according to the equation (1) (step S304), and, based on it, a new phase is determined (step S305). Then, when the phase corresponding to the contact of a foot of the walking machine 11 with the ground matches the new phase, a state variable (rhythm sound, for example) relating to the timing at which the foot of the waling machine 11 contacts the ground is generated from the signal output section 33 and transmitted to the controlled object side (step S306).

Next, refer to FIG. 5 and FIG. 7. A state variable relating to the timing at which a foot of the walking machine 12 as a controlled object contacts the ground (dynamic behavior) (changes in pressure detected by a pressure sensor or changes in acceleration detected by an acceleration sensor) is inputted into the signal input section 41 of the FBS module 14 of the walking machine 11 corresponding to the controller (step S401). Based on the state variable, the phase on the controlled object side (phase of walking rhythm) is calculated, and the operation section 42 calculates a phase difference as a relation value between the phase on the controlled object side and an internal phase of the NLS module 13 according to, for example, the equation (3) (step S402). The process up to this point is the same as the flow of the process in the NLS module 13 (except for the input of the internal phase of the NLS module 13), so that the process may be shared by the both modules. In the FBS module 14, the difference between the measured phase difference (relation value) and a target phase difference (target relation value) is calculated (step S403). Then, a feedback control signal FB is calculated according to, for example, the equation (4) (step S404), and, based on it, the amount of correction of, for example, the natural frequency $\omega 1$ (parameter) in the equation (1) regulating the dynamics of the NLS module 13 is calculated according to, for example, the equation (5) (step S405). The amount of correction is transmitted to the NLS module 13 via, for example, the signal output section 43 to adjust the parameter (step S406). As described above, a relational system control method can be realized also in a machine-machine system by utilizing the characteristics of a nonlinear system to achieve feedback control thereof.

When modules for generating nonlinear vibration are provided in partial systems of elemental robots of a group of robots or a multi-agent system and a relative system control method is applied thereto, timing synchronization in various processes and phase differences thereof can be controlled between the elemental robots or individual agents. Especially, the problem of timing synchronization in such a multi-body system has not been dealt with except in the field of central control systems, and it can be first achieved in a distributed control system employing a relational system control method. When the elemental robots or individual agents generate vibrations derived from their own nonlinearities, the dynamics thereof can be positively used for the control.

Suppose that a plurality of moving robots programmed to follow another moving robot at a specific distance are arranged on a circle like a merry-go-round. When one of the moving robots is moved for a specific period of time, the other moving robots follow the moving robot ahead of them at the same pitch and same speed. As a result, the plurality of moving robots keep moving along the circle. That is, each moving robot performs nonlinear control on the moving robot behind it. When the pitch of one of the moving robots is increased by remote control from outside, the speed of the group of the robots can be controlled since the other moving robots follow the moving robot ahead of them at the same pitch.

In an assembly line, each device repeats the same process at its own pitch and passes the process to the next device. Since the process can be finished faster or slower depending on the circumstances, the pitch of the delivery and receipt between the devices can involve nonlinearity. This is more likely when human operation is involved. Conventionally, timing control is conducted by a central control system. However, when a distributed control system employing a relational system control method is used, the pitch of each process can be varied depending on the circumstances.

As described previously, according to this embodiment, the characteristics of a nonlinear system can be utilized to achieve feedback control thereof. Thus, timing synchronization in a multi-body system and control thereof, which previously could not be dealt with, can be achieved.

The example of cooperative operation in a machine-human group system as a third embodiment of the present invention will be described in detail.

When the timing control in the machine-human system of the first embodiment and the timing control in the machine-machine system of the second embodiment are applied in combination, they are applicable to a system in which a group of human beings and machines such as robots work cooperatively or a system in which a group of human beings and machines in remote locations work cooperatively through a network. When synchronization between the controller side and the controlled object side can be established through a radio wave or network, cooperation between human beings and robots in remote locations can be achieved relatively easily.

Examples of cooperative work between human beings and robots include various embodiments relating to social communication between human beings, such as walking rehabilitation carried out in cooperation by a plurality of human beings and a plurality of robots and a musical ensemble enjoyably created in cooperation by a plurality of human beings and a plurality of robots. As the cooperative work through a network, cooperative work can be realized in various scenes in social communication between human beings in remote locations through an agent (software module) on a network in addition to rehabilitation or ensemble carried out between remote locations.

In a traffic system for controlling traffic signals depending on the flow of traffic, when each traffic signal device receives data on signal indication timing from a plurality of adjacent traffic signal devices and monitors the traffic conditions around it to determine its timing of indication, control of traffic by traffic signals involves nonlinearity since the traffic conditions are constantly changing, since the timing may be inconsistent among adjacent signal devices, and since motor vehicles are mainly driven by human beings. Although synchronization between traffic signal devices should be carried out at different timings, when the traffic signal devices can mutually control the timing of signal indication and a distributed control system employing a relational system control method is used, there is a possibility that a smooth flow of traffic can be achieved.

As described previously, according to this embodiment, the characteristics of a nonlinear system are utilized to achieve feedback control thereof. Thus, timing synchronization in social communication in a machine-human group system and control thereof, which previously could not be dealt with, can be achieved.

Also, the present invention can be implemented as a program for causing a controller to perform the control method described in the description of the embodiments. The program may be recorded on a ROM or RAM built in the controller and used, may be read from a storage device or CDROM and used, or may be downloaded into the controller though the Internet and used.

It should be understood that the present invention is not limited to the above embodiments and various modifications can be made thereto without departing from the scope of the present invention.

For example, an example in which the relation value is a phase difference has been described, but the relation value may be a difference between frequencies. Also, an example in which the operation section of the NLS module performs both an interaction with the controlled object and operation processing has been described, but the interaction may be performed by a different section. Further, there are many systems having nonlinearity among systems using a computer network such as distance learning using two-way communication in addition to the above embodiments. Also, various types of sensors and communication tools can be used for transmission and reception of state variables between a controller and a controlled object.

The present invention is applicable to assistance for cooperative work or communication in a human-human system. That is, since motion of a human being and an interaction between human beings are themselves nonlinear systems, when a human being as an instructor provides training or education to a human being as a student, a nonlinear interaction is performed between the instructor and student. In this case, the present invention is applicable to a controller which assists the cooperation between the instructor and student while performing a nonlinear interaction to both the instructor and student, such as a pacemaker for providing the same rhythm or different rhythms to the instructor and the student. In addition, utilization as a controller for assisting communication between performer and audience in a concert or lecture can be expected.

The invention claimed is:

1. A nonlinear controller comprising: a first module composed of a nonlinear system for creating a synchronous state with a controlled object through a nonlinear interaction with the controlled object; and
   a second module composed of a feedback system for adjusting a parameter to vary a relation value of the first module relating to a synchronization with the controlled object based on a difference between the relation value and a target relation value, wherein the controlled object is controlled by convergence of the relation value relating to the synchronization of the first module to the target relation value, and
   the first module vibrates at different natural frequencies from the controlled object, and the nonlinear interaction has an entrainment effect.

2. The nonlinear controller as recited in claim 1, wherein the relation value relating to the synchronization is a phase difference between a vibration of the controlled object and a vibration of the first module, and a parameter is the natural frequency of the first module.

3. The nonlinear controller as recited in claim 2, wherein the synchronous state between the first module and the controlled object is achieved through transmission and reception of rhythm.

4. The nonlinear controller as recited in claim 3, wherein the synchronous state between the first module and the controlled object is achieved through a radio wave or network.

5. The nonlinear controller as recited in claim 2, wherein the synchronous state between the first module and the controlled object is achieved through a radio wave or network.

6. The nonlinear controller as recited in claim 1, wherein the synchronous state between the first module and the controlled object is achieved through transmission and reception of rhythm.

7. The nonlinear controller as recited in claim 6, wherein the synchronous state between the first module and the controlled object is achieved through a radio wave or network.

8. The nonlinear controller as recited in claim 1, wherein the synchronous state between the first module and the controlled object is achieved through a radio wave or network.

9. A computer readable medium encoded with a computer program causing a computer to:
   create a synchronous state with a controlled object through a nonlinear interaction with the controlled object;
   acquire a state variable relating to a dynamic behavior of the controlled object;
   adjust a parameter for varying a relation value relating to a synchronization with the controlled object based on a difference between the relation value relating to the synchronization and a target relation value;
   create a new synchronous state with the controlled object using the adjusted parameter,
   wherein the nonlinear interaction has an entrainment effect.

10. A nonlinear controller comprising:
    a first module composed of a nonlinear system (NLS) for achieving a synchronous state with a controlled object through a nonlinear interaction, in which dynamic behavior of a controller and the controlled object cannot be clearly separated, the nonlinear interaction being between the first module and the controlled object; and
    a second module composed of a feedback system (FBS) for adjusting a parameter of the first module to vary a relation value relating to a synchronization with the controlled object directly using the difference between the relation value and a target relation value in the nonlinear interaction in which dynamic behavior of a controller and a controlled object cannot be clearly separated,
    wherein the nonlinear interaction has an entrainment effect, and the controlled object is controlled by convergence of the relation value relating to the synchronization of the first module to the target relation value.

11. The nonlinear controller as recited in claim 10 wherein the synchronous state between the first module and the controlled object is achieved through transmission and reception of rhythm.

12. The nonlinear controller as recited in claim 10, wherein the synchronous state between the first module and the controlled object is achieved through a radio wave or network.

13. A nonlinear control method for controlling a controlled object using a nonlinear controller having a first module composed of a nonlinear system (NLS) for achieving a synchronous state with the controlled object through a nonlinear interaction with the controlled object and a second module composed of a feedback system (FBS) for adjusting a parameter of the first module to vary a relation value relating to a synchronization with the controlled object based on the difference between the relation value and a target relation value, comprising:
   achieving a first synchronous state through a nonlinear interaction, the nonlinear interaction being between the first module and the controlled object and having an entrainment effect, wherein said achieving of a first synchronous state is done in the first module;

adjusting a parameter of the first module for varying a relation value relating to the synchronization between the first module and the controlled object directly using the difference between the relation value relating to the synchronization and a target relation value through the nonlinear interaction in which dynamic behavior of a controller and a controlled object cannot be clearly separated, wherein the adjusting is done in the second module; and achieving a second synchronous state with the controlled object using the adjusted parameter and converging the relation value relating to the synchronization to the target relation value through co-operation of the first module and the second module.

14. A nonlinear control program stored on a computer readable medium for causing a computer to:

control an object using a nonlinear controller having a first module composed of a nonlinear system (NLS) for achieving a synchronous state with the controlled object through a nonlinear interaction with the controlled object and a second module composed of a feedback system (FBS) for adjusting a parameter of the first module to vary a relation value relating to a synchronization with the controlled object based on the difference between the relation value and a target relation value;

achieve a first synchronous state through a nonlinear interaction, the nonlinear interaction being between the first module and the controlled object and having an entrainment effect, wherein said achieving of a first synchronous state is done in the first module;

adjust a parameter of the first module for varying a relation value relating to the synchronization between the first module and the controlled object directly using the difference between the relation value relating to the synchronization and a target relation value through the nonlinear interaction in which dynamic behavior of a controller and a controlled object cannot be clearly separated, wherein the adjusting is done in the second module; and achieve a second synchronous state with the controlled object using the adjusted parameter and converging the relation value relating to the synchronization to the target relation value through co-operation of the first module and the second module.

\* \* \* \* \*